United States Patent
Schoppel et al.

(10) Patent No.: US 10,989,324 B2
(45) Date of Patent: Apr. 27, 2021

(54) HYDRAULIC SPOOL VALVE

(71) Applicant: Robert Bosch GmbH, Stuttgart (DE)

(72) Inventors: Georg Schoppel, Lohr (DE); Werner Zeh, Dorfprozelten (DE); Alexander Kroeper, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/652,152

(22) PCT Filed: Oct. 2, 2018

(86) PCT No.: PCT/EP2018/076713
§ 371 (c)(1),
(2) Date: Mar. 30, 2020

(87) PCT Pub. No.: WO2019/072622
PCT Pub. Date: Apr. 18, 2019

(65) Prior Publication Data
US 2020/0248830 A1 Aug. 6, 2020

(30) Foreign Application Priority Data
Oct. 9, 2017 (DE) ...................... 10 2017 217 924.4

(51) Int. Cl.
*F16K 31/122* (2006.01)
*F16K 11/07* (2006.01)
(52) U.S. Cl.
CPC ............ *F16K 31/122* (2013.01); *F16K 11/07* (2013.01)
(58) Field of Classification Search
CPC ................................ F16K 11/07; F16K 31/122
See application file for complete search history.

(56) References Cited

U.S. PATENT DOCUMENTS 4,022,425 A * 5/1977 Govzman ............ F16K 11/0708
251/324
5,078,179 A * 1/1992 Amrhein ............. F16K 11/0716
137/625.3

(Continued)

FOREIGN PATENT DOCUMENTS

| DE | 34 36 671 A1 | 4/1986 |
| DE | 36 44 269 A1 | 7/1988 |
| JP | 2013-32846 A | 2/2013 |

OTHER PUBLICATIONS

International Search Report corresponding to PCT Application No. PCT/EP2018/076713, dated Jan. 4, 2019 (German and English language document) (6 pages).

*Primary Examiner* — Angelisa L. Hicks
(74) *Attorney, Agent, or Firm* — Maginot, Moore & Beck LLP

(57) ABSTRACT

A hydraulic spool valve includes a valve housing which has a valve bore having two control chambers, which directly follow one after the other axially at a distance and extend beyond the diameter of the valve bore. A connection surface of the valve housing has a pump connection opening connected by a first fluid channel to a first of the two control chambers. A consumer connection opening is connected by means of a second fluid channel to a second of the two control chambers. The valve has a control piston, which is guided back and forth in the valve bore to fluidically connect or separate the two control chambers. A radial web of the valve housing projects into each control chamber, with an extension delimited in the circumferential direction. The web in the second control chamber is longer in the circumferential direction than the web in the first control chamber.

9 Claims, 3 Drawing Sheets

(56) References Cited

U.S. PATENT DOCUMENTS

| | | | |
|---|---|---|---|
| 6,695,737 B2* | 2/2004 | Park | F16H 57/04 137/625.64 |
| 2016/0266600 A1* | 9/2016 | Bertram | H01F 7/1844 |
| 2017/0299094 A1* | 10/2017 | Hoevel | F16J 15/061 |

* cited by examiner

HYDRAULIC SPOOL VALVE

This application is a 35 U.S.C. § 371 National Stage Application of PCT/EP2018/076713, filed on Oct. 2, 2018, which claims the benefit of priority to Serial No. DE 10 2017 217 924.4, filed on Oct. 9, 2017 in Germany, the disclosures of which are incorporated herein by reference in their entirety.

The disclosure relates to a hydraulic spool valve, comprising a valve body which has a valve bore, having two control chambers which directly follow one another axially at a distance from one another and go beyond the diameter of the valve bore and, in a connection face, has a pump connection port which is connected via a first fluid channel to a first of the two control chambers, and a consumer connection port which is connected via a second fluid channel to a second of the two control chambers, and comprising a control piston which is guided so as to be movable back and forth in the valve bore in order to fluidically connect the two control chambers to one another and separate said chambers from one another. A radial web of the valve body, the extent of which is limited in the peripheral direction, protrudes into each control chamber.

BACKGROUND

A hydraulic spool valve of this type is known from DE 36 44 269 C2. Spool valves of this type are primarily in the form of directional valves for controlling the direction of movement of a hydraulic consumer. The connection ports are located in a connection face of the valve body, a specific hole pattern being defined for the location of the connection ports relative to one another and relative to the valve bore for each nominal size of a directional valve. Depending on the nominal size of a directional valve, a plurality or all of the connection ports are located outside a central axis which is perpendicular to the connection face and passes through the axis of the valve bore.

According to DE 36 44 269 C2, in an annular control chamber, a web is provided which protrudes radially into the control chamber. A web is provided in particular in the control chambers which are assigned to connection ports which are located outside said central axis and into which a fluid channel opens tangentially. A web in a control chamber is intended to prevent an annular flow and a rotational movement of the control piston caused by said flow. A rotational movement of this type would entail increased wear on control pistons and bodies and increased leakage. The flow losses caused by an annular flow per se are not considered in greater detail in DE 36 44 269.

SUMMARY

The disclosure addresses the problem of designing a hydraulic spool valve, which has at least one pump connection port and at least one consumer connection port, in such a way that, in the case of a flow of hydraulic fluid from the pump connection port to the consumer connection port, the flow resistance for the hydraulic fluid is low.

In the case of a hydraulic spool valve, comprising a valve body, which has a valve bore having two control chambers which directly follow one another axially at a distance from one another and go beyond the diameter of the valve bore and, in a connection face, has a pump connection port which is connected via a first fluid channel to a first of the two control chambers, and a consumer connection port which is connected via a second fluid channel to a second of the two control chambers, and comprising a control piston which is guided so as to be movable back and forth in the valve bore in order to fluidically connect the two control chambers to one another and separate said chambers from one another, a radial web of the valve body, the extent of which is limited in the peripheral direction, protruding into each control chamber, this problem is solved in that the second web in the second control chamber is longer in the peripheral direction than the first web in the first control chamber. In this way, annular flows in the control chambers and flow losses as a consequence thereof are prevented in a particularly effective manner. By means of the long web, the formation of ring vortexes in the second control chamber is prevented and, as a result, the flow resistance for the flow of hydraulic fluid is reduced.

In order to include the case in which the depth of one control chamber is different from the depth of the other control chamber, more generally, it can be said that the second web extends over a greater angle than the first web, wherein the vertex of the angle is located in each case on the central axis of the valve bore.

It should be noted that the webs are also effective even when they do not reach as far as the diameter of the valve bore, but rather are at a distance therefrom, and thus there is still a gap between said webs and a piston collar on the control piston.

The walls limiting a web in the peripheral direction preferably do not lie in a radial plane. Rather, they extend in such a way that the radially inward facing face of a web extends over a smaller angle than the radially outer face, wherein the vertices of the angles are located on the axis of the valve bore.

The first web is preferably wedge shaped, and the two flanks of the wedge converge to form a point.

Conventionally, defined, body-side control edges are produced at the transition from a control chamber to the valve bore by an undercut. It is now very advantageous for the height of the web located in a control chamber having an undercut to be selected in such a way that the web ends radially above the undercut. In the case of the undercut, the web is then definitely not acted on by the tool used for the undercutting so that the tool is not subjected to high loads, and a high-quality control edge is obtained. It is explicitly noted that it is also very advantageous for the height of the web located in a control chamber having an undercut to be selected in such a way that the web ends radially above the undercut when the first web and the second web are the same length in the peripheral direction, or even when the second web is shorter than the first web in the peripheral direction.

The web which is short in the peripheral direction also counteracts a rotational movement of the control piston if the first fluid channel tangentially cuts into the first control chamber, as is the case for all nominal sizes of the directional valves.

The first web is preferably positioned at least approximately so that a central axis running radially through said web and through the axis of the valve bore impinges on the central axis of the first fluid channel perpendicularly (90-degree position). However, a position is also conceivable in which a central axis running radially through said web and through the axis of the valve bore impinges on the central axis of the first fluid channel in parallel (0-degree position) or any position in between.

The second web in the peripheral direction can also be limited by radially extending walls.

The second web extends preferably over an angle of approximately 90 degrees in the peripheral direction, wherein the vertex of the angle is located on the axis of the valve bore.

When the second fluid channel impinges on the second control chamber in an approximately radial manner, the second web is advantageously arranged in such a way that said web is diametrically opposite the second fluid channel with respect to the axis of the valve bore.

BRIEF DESCRIPTION OF THE DRAWINGS

One exemplary embodiment of a hydraulic spool valve according to the disclosure is shown in the drawings. The disclosure will now be described in greater detail with reference to these drawings, in which.

DETAILED DESCRIPTION

Figure 1:
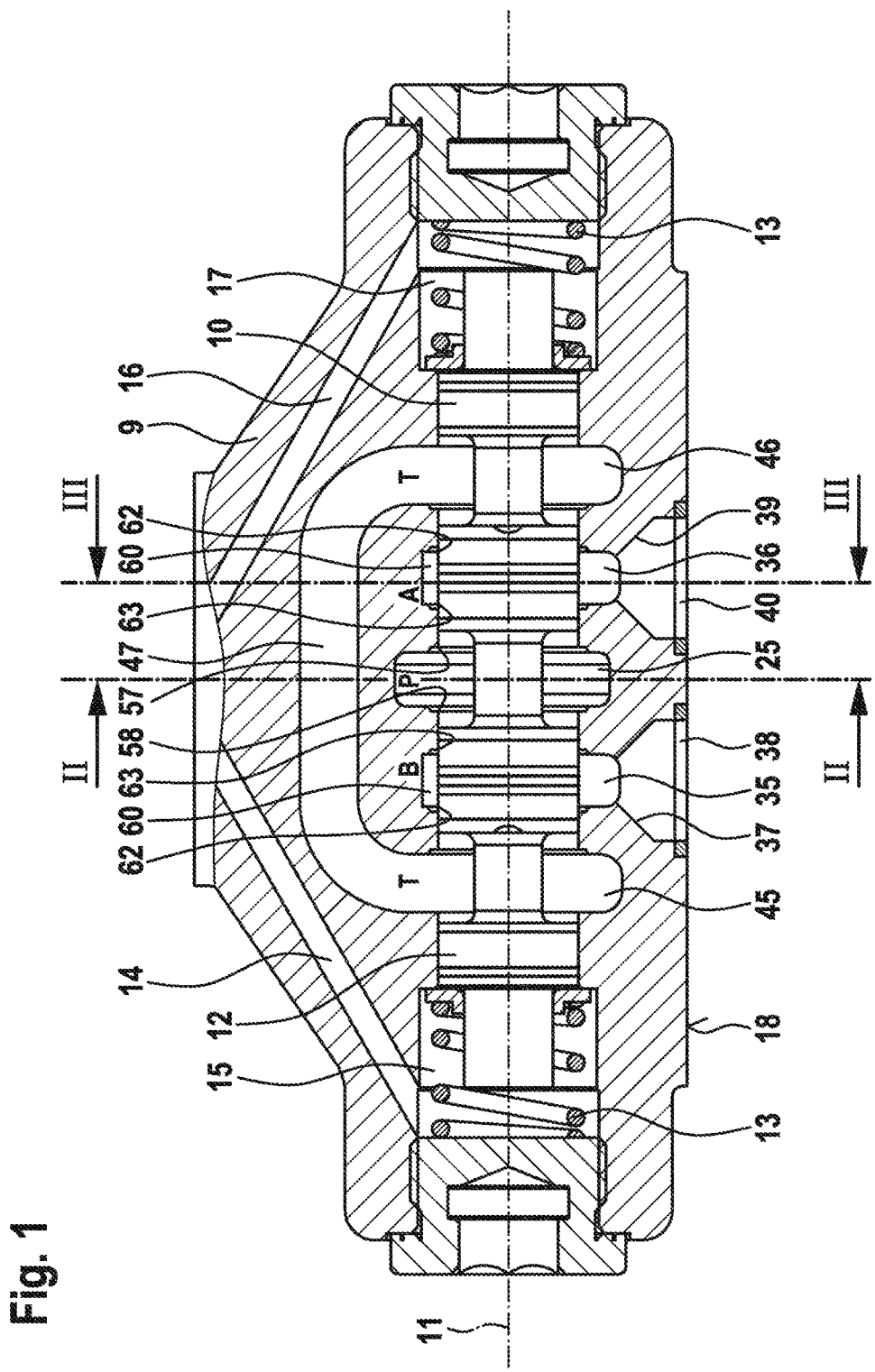
FIG. 1 is a longitudinal section through the exemplary embodiment in the form of a 4/3-way valve.

The hydraulic spool valve shown is a 4/3-way valve, that is to say a directional valve comprising four connections and three switch positions. The four connections are a pump connection, a tank connection and two consumer connections, to which for example a double-acting hydraulic cylinder is connected.

The spool valve is electrohydraulically pilot controlled. Said valve has a valve body 9, which is permeated by a valve bore 10 having a central axis 11, in which bore a control piston 12 can be moved in two opposing directions. By means of two centering springs 13, the control piston 12 is centered in a central position in which all the connections are blocked with respect to one another. A pilot control channel 14 leads from an electromagnetically operable pilot valve (not shown) to a first pressure chamber 15 in front of one end face of the control piston 12, and a second pilot control channel 16 leads from the pilot valve to a second pressure chamber 17 in front of the other end face of the control piston 12. In order to move the control piston 12 out of the central position into an operating position in which the pump connection is fluidically connected to one consumer connection, and the tank connection is fluidically connected to the other consumer connection, by means of the pilot valve, one pressure chamber is pressurized, and the other pressure chamber is discharged to the tank.

A total of five annular control chambers are formed in the valve bore 11, which chambers follow one another axially at a distance from one another and go beyond the diameter of the valve bore 9 and which are connected by means of fluid channels extending in the valve body to connection ports located in a connection face 18. The central control chamber 25 which, except in FIG. 1, can also be seen in the section according to FIG. 2, is fluidically connected by means of a fluid channel 26 to the pump connection port 27. As can be clearly seen from FIG. 2, the pump connection port is not located in a plane 28 which is perpendicular to the connection face and passes through the central axis 11 of the valve bore 9, and the fluid channel 26 tangentially cuts into the control chamber 25.

At a distance from the control chamber 25, a control chamber 35 follows said chamber on one side, and a control chamber 36 follows said chamber on the other side. The control chamber 35 is fluidically connected by means of a fluid channel 37 to a consumer connection port 38, and the control chamber 36 is fluidically connected by means of a fluid channel 39 to a consumer connection port 40. The fluid channels 37 and 39, and the consumer connection ports 38 and 40 are located, as can be seen from FIGS. 1 and 3, in the plane 28.

The control chamber 35 is followed by a control chamber 45, and the control chamber 36 is followed by a control chamber 46. The two control chambers 45 and 46 are fluidically interconnected by means of a channel clasp 47 formed in the valve body 9. In the case of the shown nominal size of a directional valve, a fluid channel 48 (see FIG. 4) leads from the control chamber 45 to a first tank connection port, and a fluid channel 49 leads from the control chamber 46 to a second tank connection port. One of the two tank connection ports can be selected for connection to a tank. Like the pump connection port, the two tank connection ports are not located in the plane 28, and the fluid channels 48 and 49 tangentially cut into the control chambers 45 and 46. The pump connection port 27 is located on one side of the plane 28, the tank connection ports are located on the other side of the plane 28.

In order to have a low flow resistance for the hydraulic fluid when there is an open connection between the control chamber 25 and a control chamber 35 or 36, the control chambers 25, 35 and 36 are provided with webs which are an integral part of the valve body 9 and reduce the radial depth of the control chambers. In the control chamber 25, there is a wedge-shaped web 55, which can be seen in FIG. 2 as an elevation and in FIG. 4 as a recess. The wedge is rounded in each case at the point and at the base. The two flanks of the web are the same length, the web 55 thus forms an isosceles wedge. Overall, the wedge-shaped web 55 extends over an angle of approximately 30 degrees, wherein the vertex of the angle is located on the central axis 11. Inside the control chamber 25, the web 55 is positioned in such a way that the point thereof is located in a plane 56 which is perpendicular to the plane 28 and passes through the central axis 11 of the valve bore 9.

At the two transitions from the control chamber 25 to the valve bore 9, a neat and defined body-side control edge 57 and 58 is produced in each case by an undercut. The height of the web 55 is now selected in such a way that the web ends radially just above the undercuts. The web 55 is thus not touched during the undercutting.

Figure 2:
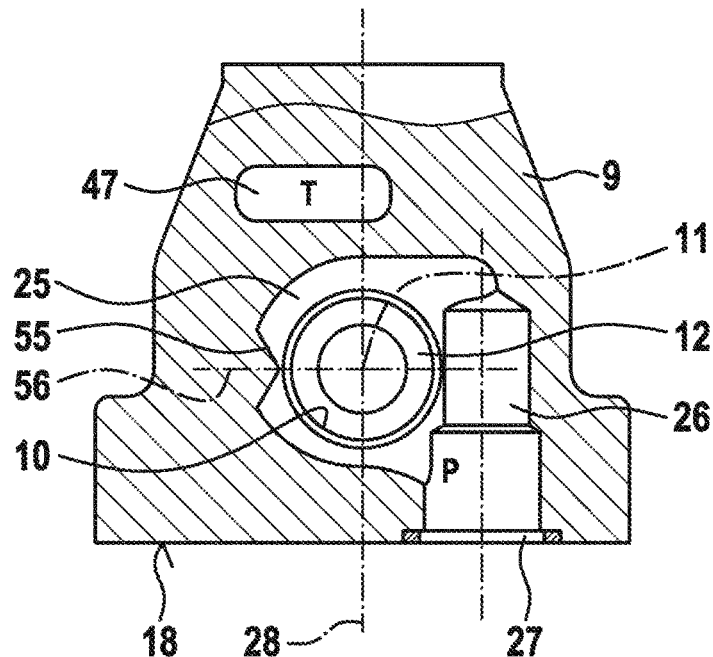
FIG. 2 is a section along the line II-II from FIG. 1.
Figure 3:
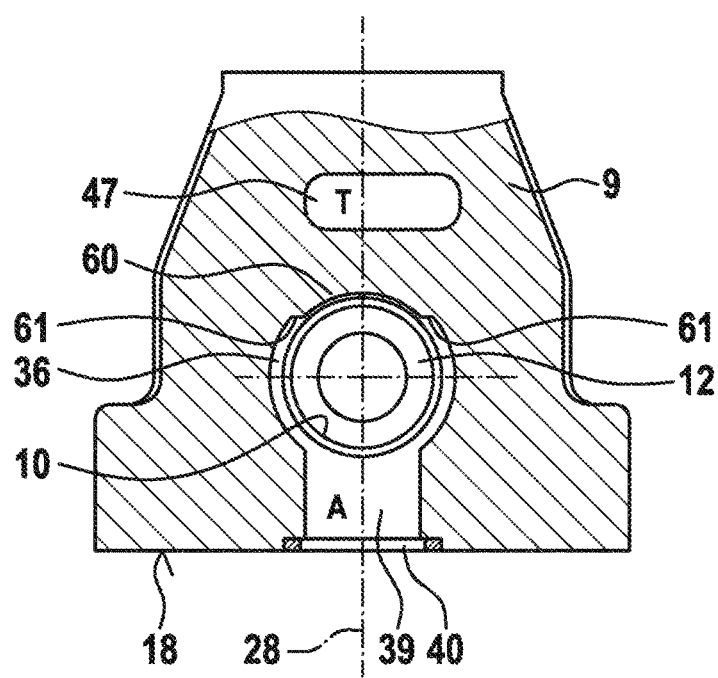
FIG. 3 is a section along the line III-III from FIG. 1.
Figure 4:
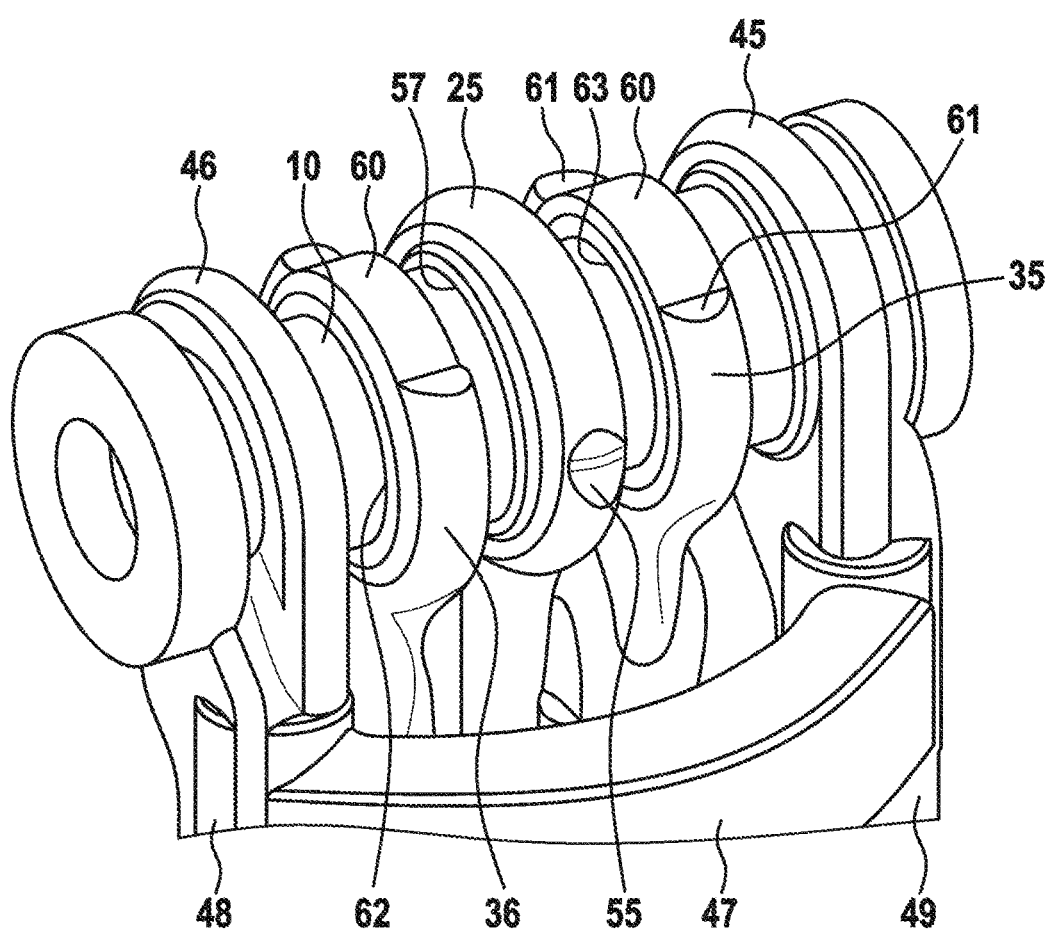
FIG. 4 is a perspective view of hollow spaces inside a directional valve which is modified slightly with respect to the exemplary embodiment from FIGS. 1 to 3.

In the control chambers 35 and 36, in each case there is a web 60, which can be seen in FIGS. 1 and 3 as an elevation and in FIG. 4 as a recess. In the peripheral direction, the web is limited by walls 61 which are not located in a radial plane, but rather are both located in the same tangential plane. The radially inward facing face of a web 60 extends over a smaller angle than the radially outer face, wherein the vertices of the angles are located on the central axis 11 of the valve bore.

Overall, the radially outer face of the web 60 extends over an angle of approximately 90 degrees. Inside a control chamber 35, 36, the web 60 is positioned in such a way that said web is located symmetrically on both sides of the plane 28.

At the two transitions from the control chamber 35, 36 to the valve bore 9 as well, a neat and defined body-side control edge 62 and 63 is produced in each case by an undercut. The height of the web 60 is now selected in such a way that the web 60 ends radially just above the undercuts. The webs 60 are thus not touched during the undercutting either.

It is clear from FIGS. 1 to 3 that in the case of the exemplary embodiment shown, the channel 37 extends above and at least in part to the side of the valve bore 9 when the connection face 38 is considered to be the lower face of the valve body. In FIG. 4, by contrast, the channel clasp 37 connecting the two control chambers 45 and 46 extends underneath and to the side of the valve bore 9 and directly connects the two fluid channels 48 and 49 leading to the tank connection ports.

LIST OF REFERENCE SIGNS 9 valve body
10 valve bore
11 central axis of
12 control piston
13 centering spring
14 pilot control channel
15 pressure chamber
16 pilot control channel
17 pressure chamber
18 connection face
25 control chamber
26 fluid channel
27 pump connection port
35 control chamber
36 control chamber
37 fluid channel
38 consumer connection port
39 fluid channel
40 consumer connection port
45 control chamber
46 control chamber
47 channel clasp
48 fluid channel
49 fluid channel
55 wedge-shaped web
56 plane
57 control edge
58 control edge
60 web
61 walls of
62 control edge
63 control edge

The invention claimed is:

1. A hydraulic spool valve comprising:
a valve body defining:
a valve bore having a central axis;
two control chambers which directly follow one another axially at a distance from one another and extend beyond a diameter of the valve bore and;
a pump connection port defined in a connection face of the valve body, the pump connection port connected via a first fluid channel to a first control chamber of the two control chambers; and
a consumer connection port connected via a second fluid channel to a second control chamber of the two control chambers; and
a control piston guided so as to be movable back and forth in the valve bore to selectively fluidically connect the two control chambers to one another and separate said two control chambers from one another,
wherein the valve body comprises a first radial web protruding into the first control chamber and a second radial web protruding into the second control chamber, an extent of each of the first and second radial webs being limited in a peripheral direction, and
wherein the second web has a greater length in the peripheral direction than the first web.

2. The hydraulic spool valve as claimed in claim 1, wherein walls of the valve body limiting one of the first and second webs in the peripheral direction are not located in a radial plane in such a way that a radially inward facing face of the one web extends over a smaller angle, measured with a vertex located on the central axis of the valve bore, than a radially outer face.

3. The hydraulic spool valve as claimed in claim 2, wherein the first web is wedge shaped.

4. The hydraulic spool valve as claimed in claim 1, wherein at least one transition from one of the two control chambers to the valve bore includes a defined, body-side control edge configured as an undercut, and a height of a corresponding one of the first and second webs is selected in such a way that the corresponding web ends radially above the undercut.

5. The hydraulic spool valve as claimed in claim 1, wherein the first fluid channel tangentially cuts into the first control chamber.

6. The hydraulic spool valve as claimed in claim 5, wherein the first web is positioned at least approximately so that said first web is diametrically opposite to the first fluid channel with respect to the valve bore.

7. The hydraulic spool valve as claimed in claim 1, wherein the second web is limited in the peripheral direction by radially extending walls.

8. The hydraulic spool valve as claimed in claim 1, wherein the second web extends in the peripheral direction over an angle, measured with a vertex on the central axis of the valve bore, of approximately 90 degrees.

9. The hydraulic spool valve as claimed in claim 1, wherein the second fluid channel meets the second control chamber approximately radially, and wherein the second web is diametrically opposite to the second fluid channel with respect to the central axis of the valve bore.

* * * * *